United States Patent
Kim et al.

[11] Patent Number: 6,125,468
[45] Date of Patent: Sep. 26, 2000

[54] HIGH-SPEED DATA RECORDING METHOD FOR DIGITAL VERSATILE DISK-RANDOM ACCESS MEMORY

[75] Inventors: Suk-Bum Kim, Seoul; Yoon-Woo Lee, Suwon, both of Rep. of Korea

[73] Assignee: Samsung Electronics Co., Ltd., Suwon, Rep. of Korea

[21] Appl. No.: 09/013,537

[22] Filed: Jan. 26, 1998

[30] Foreign Application Priority Data

Jan. 29, 1997 [KR] Rep. of Korea .......................... 97-2524

[51] Int. Cl.$^7$ .................................................. G11C 29/00
[52] U.S. Cl. ........................................................ 714/769
[58] Field of Search ................................... 714/769, 770, 714/771

[56] References Cited

U.S. PATENT DOCUMENTS

| | | | |
|---|---|---|---|
| 4,734,901 | 3/1998 | Murakami | 369/59 |
| 4,761,785 | 8/1988 | Clark et al. | 371/51 |
| 5,375,128 | 12/1994 | Menon et al. | 371/40.1 |
| 5,388,105 | 2/1995 | Takagi et al. | 371/37.7 |
| 5,404,249 | 4/1995 | Seki | 360/48 |
| 5,434,991 | 7/1995 | Maeda et al. | 395/425 |

FOREIGN PATENT DOCUMENTS

| | | |
|---|---|---|
| 0 596 139 A1 | 5/1994 | European Pat. Off. . |
| 10-64066 | 3/1998 | Japan . |

*Primary Examiner*—Albert De Cady
*Assistant Examiner*—Samuel Lin
*Attorney, Agent, or Firm*—Staas & Halsey LLP

[57] ABSTRACT

A data recording method error-correction-code (ECC)-encodes and modulates data of a file to be recorded in units of data blocks, and records the encoded and modulated data on a digital versatile disk-random access memory (DVD-RAM). Dummy data is added to make a last data block when the size of a file to be recorded is not an integer multiple of a data block, and then the last data block is ECC-encoded and modulated for recording the same on a DVD-RAM. The recording of data is performed in a recording region of a DVD-RAM where no data is recorded, and also starts from a recording region just next to the last data even when the last data of the previously recorded file includes dummy data.

8 Claims, 2 Drawing Sheets

HIGH-SPEED DATA RECORDING METHOD FOR DIGITAL VERSATILE DISK-RANDOM ACCESS MEMORY

BACKGROUND OF THE INVENTION

1. Field of the Invention

The present invention relates to a method for recording data on a digital versatile disk (DVD), and more particularly, to a high-speed data recording method for a digital versatile disk-random access memory (DVD-RAM).

2. Description of the Related Art

A recent form of a DVD is a DVD-RAM in which data can be freely recorded and deleted. Since a DVD-RAM has a recording capacity for recording massive amounts of data, it requires a high-speed data recording time.

FIG. 1 shows the structure of a data sector which is used for recording data on a DVD-RAM. A data sector has the size of 2064 bytes, which comprises 12 rows each having 172 bytes. Each row in the data sector includes main data which is recording information. The first row in the data sector includes identification (ID), identification error correction code (IEC), and reserved (RSV) data in its beginning portion, and the twelfth row being the last row therein includes an error detection code (EDC) of 4 bytes in its end portion. The 4-byte ID data included in the first row contains a sector number and sector information, the 2-byte IEC contains an error correction code with respect to the ID data, and the 6-byte RSV contains other data. For convenience of explanation, 16 data sectors, in which FIG. 1 shows one data sector, is called a data block.

FIG. 2 is a block diagram of an existing system for recording data on a DVD-RAM. A computer system 100 of FIG. 2 supplies data of a file to be recorded to a DVD-RAM drive 200 in units of data blocks. The DVD-RAM drive 200 error-correction-code (ECC)-encodes the data blocks supplied from the computer system 100. Here, in the case when the size of a file to be recorded is not an integer multiple of the size of a data block, the computer system 100 supplies data of a file to the DVD-RAM drive 200 in units of data blocks, and adds dummy data to the last data of the file to form a last data block. Then, the DVD-RAM drive 200 ECC-encodes the last data block supplied from the computer system 100. The dummy data is meaningless data to be filled in a last data block. The DVD-RAM drive 200 modulates an ECC block produced by the ECC encoding, produces 16 physical sectors, and records data on a DVD-RAM 300 in recording units of the 16 physical sectors. For the convenience of explanation, the 16 physical sectors is called a physical data block.

When a new file is recorded on the DVD-RAM 300, the DVD-RAM drive 200 reads the last physical data block of the previously recorded file from the DVD-RAM 300, and restores the read physical data block into a data block. Then, the DVD-RAM drive 200 replaces dummy data in the restored data block with main data of the new file, ECC-encodes and modulates the data blocks of the new file including the replaced data block, and records the new ECC-encoded and modulated data block on the DVD-RAM 300. The recording of the data block starts from the portion where the last physical data block has been recorded.

As described, whenever recording a file, the DVD-RAM drive 200 according to the conventional data recording method restores data of an end portion of the file which is lastly recorded on the DVD-RAM 300, and produces a data block together with data of a file to be recorded, thereby causing an increase in a data recording time.

SUMMARY OF THE INVENTION

To solve the above problems, it is an object of the present invention to provide a method for recording data on a DVD-RAM which can reduce a data recording time, by recording new data on the DVD-RAM without removing previously recorded dummy data.

Additional objects and advantages of the invention will be set forth in part in the description which follows and, in part, will be obvious from the description, or may be learned by practice of the invention.

To accomplish the above and other objects of the present invention, there is provided a method for recording data on a digital versatile disk-random access memory (DVD-RAM) comprising:

(a) error-correction-code (ECC)-encoding and modulating a file to be recorded in units of data blocks; and (b) recording the ECC-encoded and modulated data block in step (a) on a recording region of the DVD-RAM where no data is recorded. wherein in step (a), dummy data is added to make a last data block when the size of a file to be recorded is not an integer multiple of a data block, and then the last data block is ECC-encoded and modulated.

Further, the recording of data of a next file starts from a recording region just next to the last data block when the last data block on the recorded file includes dummy data.

BRIEF DESCRIPTION OF THE DRAWINGS

The preferred embodiment is described with reference to the drawings, wherein.

DETAILED DESCRIPTION OF THE PREFERRED EMBODIMENT

Figure 1:
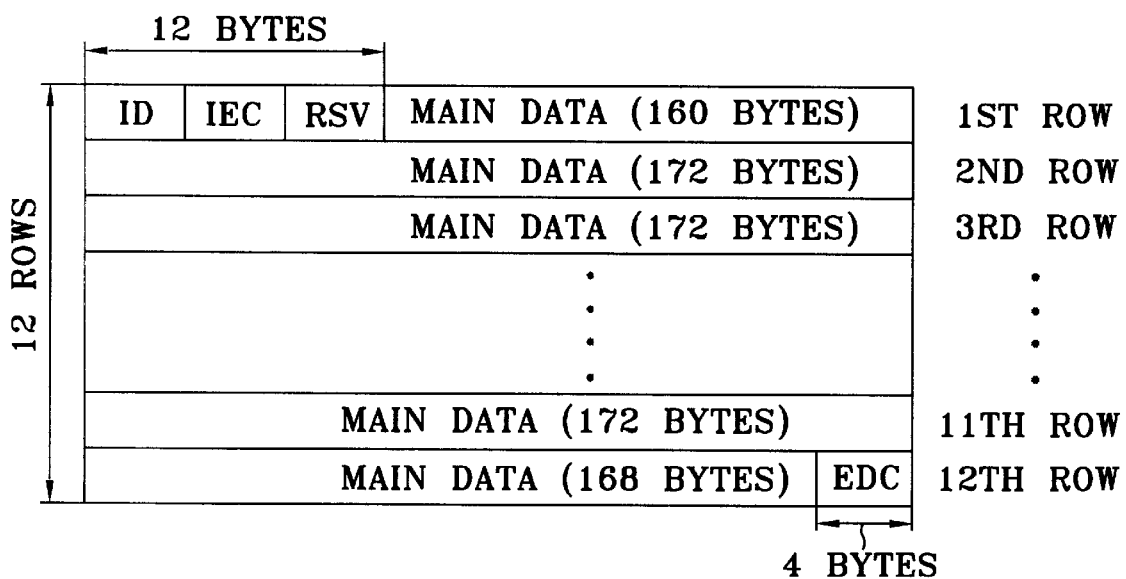
FIG. 1 shows the structure of a data sector which is used for recording data on a DVD-RAM.
Figure 2:
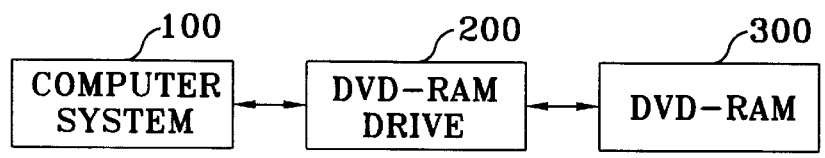
FIG. 2 is a block diagram of an existing system for recording data on the DVD-RAM.
Figure 3:
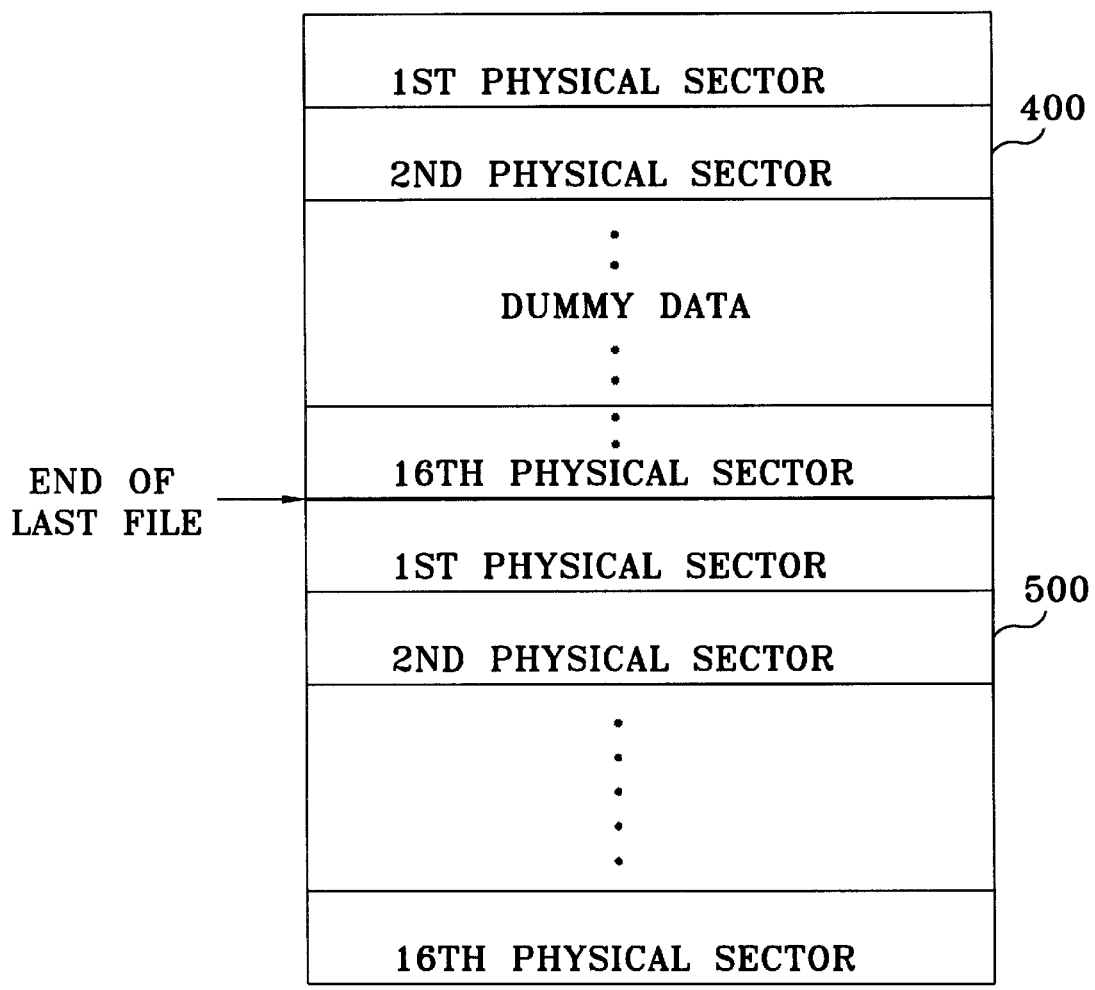
FIG. 3 is a view for explaining a method for recording data on a DVD-RAM according to an embodiment of the present invention.

FIG. 3 shows a view for explaining a method for recording data on a DVD-RAM according to an embodiment of the present invention. A method for recording data on a DVD-RAM includes the step of ECC-encoding data of a file to be recorded in units of data blocks. Dummy data is added to form a last data block when the size of a file to be recorded is not an integer multiple of a data block, and the last data block is ECC-encoded. Then, each ECC block is an ECC-encoded data block which is modulated to produce physical sectors. A data block used in the present invention has the same structure as that of a data block used in the existing method shown in FIG. 1, and one ECC block corresponds to a physical data block 400 or 500 which includes 16 physical sectors. The present invention records data of a file to be recorded on a DVD-RAM 300 in units of physical data blocks. As in the existing method shown in FIG. 1, when the size of a file to be recorded is not an integer multiple of the size of a data block, dummy data is added to the last data of the file to form a last data block.

When a new file is recorded on the DVD-RAM 300, in the case where the last physical data block 400 of the previously recorded file includes dummy data, data is recorded in a recording region 500 being just next to the last physical data block 400 where no data is recorded, leaving a region where the last physical data block 400 has been recorded.

As described above, the data recording method for recording data on the DVD-RAM 300 according to the present invention does not need to restore the previously recorded last physical data block 400 into a data block, and thus an effect for reducing data recording time can be provided.

While only a certain embodiment of the invention has been specifically described herein, it will be apparent that numerous modifications may be made thereto without departing from the spirit and scope of the invention.

What is claimed is:

1. A method for recording data on a digital versatile disk-random access memory (DVD-RAM) comprising the steps of:
    (a) error-correction-code (ECC)-encoding and modulating a file to be recorded in units of data blocks; and
    (b) recording each ECC-encoded and modulated data block in said step (a) on a recording region of the DVD-RAM where no data has been recorded, when a last record data block of a previous file includes dummy data.

2. The data recording method according to claim 1, wherein said step (a) comprises the steps of adding dummy data to form a last data block of the file when a size of the file to be recorded is not an integer multiple of a data block, and then ECC-encoding and modulating the last data block.

3. The data recording method according to claim 2, further comprising the step of starting recording of data of a next file from a recording region just next to the last data block when the last data block of the file recorded on the DVD-RAM includes the dummy data.

4. The data recording method according to claim 2, further comprising the steps of:
    (c) error-correction-code (ECC)-encoding and modulating a next file to be recorded in units of the data blocks; and
    (d) starting recording of the ECC-encoded and modulated data block of the next file just next to the dummy data of the last data block of the file already recorded on the DVD-RAM.

5. A data recording method for recording files of data on a digital versatile disk-random access memory (DVD-RAM), comprising the steps of:
    (a) error-correction-code (ECC)-encoding and modulating a current one of the files to be recorded in units of data blocks of the data and inserting dummy data into a last one of the data blocks of the current file if necessary to fill the last data block;
    (b) recording each ECC-encoded and modulated data block of the current file in a recording region of the DVD-RAM; and
    (c) processing and recording a next one of the files on the DVD-RAM in the recording region other than that occupied by the current file, thereby leaving the dummy data of the current file in the recording region.

6. The data recording method as claimed in claim 5, wherein said step (c) further comprises the steps of:
    (c1) error-correction-code (ECC)-encoding and modulating the next file to be recorded in units of data blocks of the data and inserting dummy data into a last one of the data blocks of the next file if necessary to fill the last data block; and
    (c2) recording each ECC-encoded and modulated data block of the next file in the recording region of the DVD-RAM.

7. The data recording method as claimed in claim 6, wherein said step (c2) further comprises the step of recording each ECC-encoded and modulated data block of the next file immediately next to the dummy data placed at an end of the last data block of the current file.

8. The data recording method as claimed in claim 5, wherein each data block comprises:
    a plurality of data sectors, each data sector including main data representative of recording information, identification data indicative of a sector number and sector information of a data recording medium, identification error code data, and reserved data.

* * * * *